(12) United States Patent
Yamaguchi

(10) Patent No.: US 11,247,164 B2
(45) Date of Patent: Feb. 15, 2022

(54) FILTER FOR GAS GENERATOR AND GAS GENERATOR

(71) Applicant: NIPPON KAYAKU KABUSHIKI KAISHA, Chiyoda-ku (JP)

(72) Inventor: Masahiro Yamaguchi, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 381 days.

(21) Appl. No.: 16/331,600

(22) PCT Filed: Sep. 1, 2017

(86) PCT No.: PCT/JP2017/031556
§ 371 (c)(1),
(2) Date: Mar. 8, 2019

(87) PCT Pub. No.: WO2018/051814
PCT Pub. Date: Mar. 22, 2018

(65) Prior Publication Data
US 2019/0201829 A1 Jul. 4, 2019

(30) Foreign Application Priority Data
Sep. 14, 2016 (JP) .............................. JP2016-179557

(51) Int. Cl.
*B01D 46/52* (2006.01)
*B01D 39/10* (2006.01)
(Continued)

(52) U.S. Cl.
CPC ........... *B01D 46/528* (2013.01); *B01D 39/10* (2013.01); *B01D 39/2041* (2013.01); *B01J 7/00* (2013.01);
(Continued)

(58) Field of Classification Search
CPC .. B01D 46/528; B01D 39/10; B01D 39/2041; B01D 2279/10; B01D 46/52;
(Continued)

(56) References Cited

U.S. PATENT DOCUMENTS

2005/0082804 A1 4/2005 Khandhadia
2007/0169454 A1 7/2007 Hirata
(Continued)

FOREIGN PATENT DOCUMENTS

CN 102548807 A 7/2012
CN 104169134 A 11/2014
(Continued)

OTHER PUBLICATIONS

JP2014237389A_ENG (Espacenet machine translation of Ueda) (Year: 2014).*
(Continued)

*Primary Examiner* — Jonathan Miller
*Assistant Examiner* — Gabriel E Gitman
(74) *Attorney, Agent, or Firm* — Oblon, McClelland, Maier & Neustadt, L.L.P.

(57) ABSTRACT

A filter for gas generator has an outer geometry substantially of a hollow cylinder and it is formed by a wound body of a metal wire. The metal wire is made of an elongated member having a V-shaped cross-section orthogonal to a direction of extension thereof. A V-shaped groove defined in the metal wire faces a hollow portion in the filter for gas generator and an angle α of the V-shaped groove is not smaller than 130[°] and not greater than 140[°].

4 Claims, 5 Drawing Sheets

(51) Int. Cl.
*B60R 21/264* (2006.01)
*B01J 7/00* (2006.01)
*B01D 39/20* (2006.01)

(52) U.S. Cl.
CPC ........ *B60R 21/264* (2013.01); *B01D 2279/10* (2013.01)

(58) Field of Classification Search
CPC ............... B01D 39/12; B01D 39/2027; B01D 39/2044; B01D 39/2048; B01J 7/00; B60R 21/264; B60R 21/2642; B60R 21/2644; B60R 21/2646; B60R 21/2648
See application file for complete search history.

(56) References Cited

U.S. PATENT DOCUMENTS

| | | | | |
|---|---|---|---|---|
| 2007/0193235 | A1* | 8/2007 | Hirata | B01D 39/12 55/487 |
| 2012/0308944 | A1 | 12/2012 | Enami et al. | |
| 2013/0248434 | A1 | 9/2013 | Owaki et al. | |
| 2013/0255528 | A1 | 10/2013 | Ozaki et al. | |
| 2016/0121841 | A1 | 5/2016 | Katsuta | |

FOREIGN PATENT DOCUMENTS

| | | | | |
|---|---|---|---|---|
| CN | 105339215 A | | 2/2016 | |
| EP | 3 213 805 A1 | | 9/2017 | |
| JP | 2001-171472 A | | 6/2001 | |
| JP | 2014-237389 A | | 12/2014 | |
| JP | 2014237389 A | * | 12/2014 | ........... B60R 21/264 |
| WO | WO 2005/075050 A1 | | 8/2005 | |
| WO | WO 2012/073461 A1 | | 6/2012 | |
| WO | WO 2016/068250 A1 | | 5/2016 | |

OTHER PUBLICATIONS

Combined Chinese Office Action and Search Report dated Jan. 25, 2021 in Chinese Patent Application No. 201780056337.6, 5 pages.
International Search Report dated Dec. 5, 2017 in PCT/JP2017/031556 filed Sep. 1, 2017.

* cited by examiner (GAS DISCHARGE OPENING SIDE)

(COMBUSTION CHAMBER (HOLLOW PORTION 73) SIDE)

(GAS DISCHARGE OPENING SIDE)

(COMBUSTION CHAMBER (HOLLOW PORTION 73) SIDE)

| | SPECIFICATIONS OF FILTER | | | | TEST RESULT | |
|---|---|---|---|---|---|---|
| | CIRCUMFERENTIAL LENGTH [mm] | TOTAL LENGTH [m] | WEIGHT [g] | SURFACE AREA [mm$^2$] | PRESSURE LOSS IN FILTER $\Delta P$ [kPa] | AMOUNT OF EMISSION OF SLAG [g] |
| VERIFICATION EXAMPLE 1 | 1.74 | 43.2 | 41 | $7.51 \times 10^4$ | 1.36 | 0.74 |
| VERIFICATION EXAMPLE 2 | 1.79 | 42.0 | 39 | $7.51 \times 10^4$ | 2.01 | 0.76 |
| VERIFICATION EXAMPLE 3 | 1.91 | 39.8 | 37 | $7.60 \times 10^4$ | 2.51 | 0.81 |
| VERIFICATION EXAMPLE 4 | 2.01 | 37.7 | 35 | $7.57 \times 10^4$ | 2.92 | 0.84 |

FILTER FOR GAS GENERATOR AND GAS GENERATOR

TECHNICAL FIELD

The present invention relates to a gas generator incorporated in a passenger protection apparatus and a filter for gas generator (which is also simply referred to as a filter below) equipped therein.

BACKGROUND ART

From a point of view of protection of a driver and/or a passenger in a car, an air bag apparatus which is a passenger protection apparatus has conventionally widely been used. The air bag apparatus is equipped for the purpose of protecting a driver and/or a passenger against shock caused at the time of collision of a vehicle, and it receives a body of a driver or a passenger with an air bag serving as a cushion, as the air bag is expanded and developed instantaneously at the time of collision of the vehicle.

The gas generator is equipment which is incorporated in this air bag apparatus, an igniter therein being ignited in response to power feed through a control unit at the time of collision of a vehicle to thereby burn a gas generating agent with flame caused by the igniter and instantaneously generate a large amount of gas, and thus expands and develops an air bag.

The gas generator is normally provided with a filter for the purpose of cooling of combustion gas generated in a combustion chamber and collecting a residue (slag) contained in the gas. The filter is made of a substantially cylindrical and hollow member generally made of a wound body or a knitted body of a metal wire, and it is accommodated in a housing such that gas passes therethrough radially outward from a hollow portion located inside.

For example, Japanese Patent Laying-Open No. 2014-237389 (PTL 1) discloses a filter for gas generator constructed as described above. In the filter for gas generator disclosed in the publication, a metal wire with a groove provided to extend along a direction of extension thereof is employed, and the groove is constructed to face the hollow portion in the filter for gas generator.

According to such a construction, a flow path for gas in the filter is complicated and slag contained in the gas impinging on the groove is effectively collected. Therefore, a filter for gas generator which is reduced in size and weight and high in cooling capability and slag collection capability can be obtained.

CITATION LIST

Patent Literature

PTL 1: Japanese Patent Laying-Open No. 2014-237389

SUMMARY OF INVENTION

Technical Problem

Even when a filter is made of a metal wire provided with a groove, however, depending on a specific shape of the metal wire, a problem in terms of productivity such as difficulty in shaping of the metal wire itself or a filter prone to distortion in shape due to loss of the shape of the metal wire during winding may arise.

In addition, depending on a specific shape of the metal wire, a problem in terms of performance such as increase in pressure loss in the filter, increase in amount of emission of slag due to tendency of clogging of the filter, or deformation of the filter during operation may also arise.

Therefore, the present invention was made in view of the problems described above, and an object is to provide a filter for gas generator which is high in performance and productivity and a gas generator including the same.

Solution to Problem

A filter for gas generator based on the present invention is substantially cylindrical and hollow and made of a wound body of a metal wire. The metal wire is made of an elongated member having a V-shaped cross-section orthogonal to a direction of extension thereof. A V-shaped groove defined in the metal wire faces a hollow portion in the filter for gas generator. An angle of the V-shaped groove is not smaller than 130[°] and not greater than 140[°].

In the filter for gas generator based on the present invention, preferably, a largest outer dimension of the metal wire along a direction of depth of the V-shaped groove is smaller than a largest outer dimension of the metal wire along a direction of width of the V-shaped groove.

The filter for gas generator based on the present invention is preferably constructed in a meshed pattern by diagonally winding the metal wire by folding back a direction of winding at one and the other axial ends of the filter for gas generator.

A gas generator based on the present invention includes the filter for gas generator based on the present invention described above.

Advantageous Effects of Invention

According to the present invention, a filter for gas generator which is high in performance and productivity and a gas generator including the same can be provided.

DESCRIPTION OF EMBODIMENTS

Figure 1:
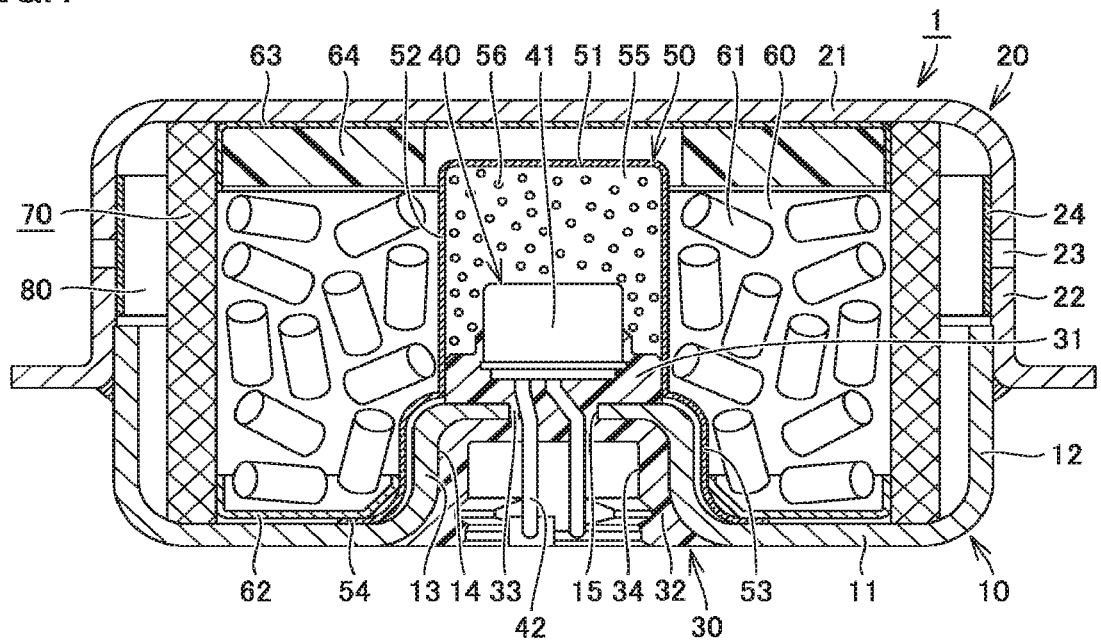
FIG. 1 is a schematic diagram of a disc-type gas generator in an embodiment of the present invention.

An embodiment of the present invention will be described hereinafter in detail with reference to the drawings. An embodiment shown below represents application of the present invention to a disc type gas generator suitably incorporated in an air bag apparatus equipped in a steering wheel of a car and a filter for gas generator equipped therein. The same or common elements in the embodiment shown below have the same reference characters allotted in the drawings and description thereof will not be repeated.

FIG. 1 is a schematic diagram of a disc-type gas generator in an embodiment of the present invention. A disc-type gas generator 1 in the present embodiment will initially be described with reference to FIG. 1.

As shown in FIG. 1, disc-type gas generator 1 in the present embodiment has a short substantially cylindrical housing having one and the other axial ends closed, and is constructed to accommodate as internal construction components in an accommodation space provided in the housing, a holding portion 30, an igniter 40, a cup-shaped member 50, an enhancer agent 56, a gas generating agent 61, a lower supporting member 62, an upper supporting member 63, a cushion material 64, a filter 70, and the like. In the accommodation space provided in the housing, a combustion chamber 60 mainly accommodating gas generating agent 61 among the internal construction components described above is located.

The short substantially cylindrical housing includes a lower shell 10 and an upper shell 20. Each of lower shell 10 and upper shell 20 is made, for example, of a press-formed product formed by press-working a plate-shaped member made of a rolled metal. A metal plate composed, for example, of stainless steel, iron steel, an aluminum alloy, a stainless alloy, or the like is made use of as the plate-shaped member made of metal which forms lower shell 10 and upper shell 20, and what is called a high tensile steel plate which is free from such a failure as fracture even at the time of application of tensile stress not lower than 440 [MPa] and not higher than 780 [MPa] is suitably made use of.

Lower shell 10 and upper shell 20 are each formed in a substantially cylindrical shape with bottom, and the housing is constructed by combining and joining the shells such that open surfaces thereof face each other. Lower shell 10 has a bottom plate portion 11 and a circumferential wall portion 12 and upper shell 20 has a top plate portion 21 and a circumferential wall portion 22. The one and the other axial ends of the housing are thus closed by top plate portion 21 and bottom plate portion 11. Electron-beam welding, laser welding (YAG laser welding and $CO_2$ laser welding), friction welding, or the like can suitably be made use of for joining lower shell 10 and upper shell 20 to each other.

A protruding cylindrical portion 13 protruding toward top plate portion 21 is provided in a central portion of bottom plate portion 11 of lower shell 10, so that a depression portion 14 is formed in the central portion of bottom plate portion 11 of lower shell 10. Protruding cylindrical portion 13 is a site to which igniter 40 is fixed with holding portion 30 described above being interposed, and depression portion 14 is a site serving as a space for providing a female connector portion 34 in holding portion 30.

Protruding cylindrical portion 13 is formed to be in a substantially cylindrical shape with bottom, and an opening 15 in a non-point-symmetrical shape (for example, in a D shape, a barrel shape, or an elliptical shape) when viewed two-dimensionally is provided at an axial end located on a side of top plate portion 21. Opening 15 is a site through which a pair of terminal pins 42 of igniter 40 passes.

Igniter 40 serves to produce flames and includes an ignition portion 41 and a pair of terminal pins 42 described above. Ignition portion 41 contains an ignition agent producing flames by being ignited to burn at the time of activation and a resistor for igniting this ignition agent. The pair of terminal pins 42 is connected to ignition portion 41 for igniting the ignition agent.

More specifically, ignition portion 41 includes a squib cup formed like a cup and a base portion closing an opening end of the squib cup and holding a pair of terminal pins 42 as being inserted therein. The resistor (bridge wire) is attached to couple tip ends of the pair of terminal pins 42 inserted in the squib cup, and the ignition agent is loaded in the squib cup so as to surround the resistor or to be in proximity to the resistor.

Here, a Nichrome wire or the like is generally made use of as a resistor, and ZPP (zirconium potassium perchlorate), ZWPP (zirconium tungsten potassium perchlorate), lead tricinate, or the like is generally made use of as the ignition agent. The squib cup which defines an outer surface of ignition portion 41 is generally made of a metal or plastic.

Upon sensing collision, a prescribed amount of current flows in a resistor through terminal pin 42. As the prescribed amount of current flows in the resistor, Joule heat is generated in the resistor and the ignition agent starts burning. Flame at a high temperature caused by burning bursts the squib cup accommodating the ignition agent. A time period from flow of a current in the resistor until activation of igniter 40 is generally not longer than 2 [ms] in a case that the Nichrome wire is employed as the resistor.

Igniter 40 is attached to bottom plate portion 11 in such a manner that terminal pin 42 is introduced from the inside of lower shell 10 to pass through opening 15 provided in protruding cylindrical portion 13. Specifically, holding portion 30 formed from a resin molded portion is provided around protruding cylindrical portion 13 provided in bottom plate portion 11, and igniter 40 is fixed to bottom plate portion 11 as being held by holding portion 30.

Holding portion 30 is formed through injection molding (more specifically, insert molding) with the use of a mold, and formed by attaching an insulating fluid resin material to bottom plate portion 11 so as to reach a part of an outer surface from a part of an inner surface of bottom plate portion 11 through opening 15 provided in bottom plate portion 11 of lower shell 10 and solidifying the fluid resin material.

Igniter 40 is fixed to bottom plate portion 11 with holding portion 30 being interposed, in such a manner that terminal pin 42 is introduced from the inside of lower shell 10 to pass through opening 15 during molding of holding portion 30 and the fluid resin material described above is fed to fill a space between igniter 40 and lower shell 10 in this state.

For a source material for holding portion 30 formed by injection molding, a resin material excellent in heat resistance, durability, corrosion resistance, and the like after curing is suitably selected and made use of. In that case, without being limited to a thermosetting resin represented by an epoxy resin and the like, a thermoplastic resin represented by a polybutylene terephthalate resin, a polyethylene terephthalate resin, a polyamide resin (such as nylon 6 or nylon 66), a polypropylene sulfide resin, a polypropylene oxide resin, and the like can also be made use of. In a case where these thermoplastic resins are selected as a source material, in order to ensure mechanical strength of holding portion 30 after molding, glass fibers or the like are preferably contained as fillers in these resin materials. In a case where sufficient mechanical strength can be ensured only by a thermoplastic resin, however, a filler as described above does not have to be added.

Holding portion 30 has an inner cover portion 31 covering a part of an inner surface of bottom plate portion 11 of lower shell 10, an outer cover portion 32 covering a part of an outer surface of bottom plate portion 11 of lower shell 10, and a coupling portion 33 located within opening 15 provided in bottom plate portion 11 of lower shell 10 and continuing to each of inner cover portion 31 and outer cover portion 32.

Holding portion 30 is secured to bottom plate portion 11 at a surface on a side of bottom plate portion 11, of each of inner cover portion 31, outer cover portion 32, and coupling portion 33. Holding portion 30 is secured at each of a side surface and a lower surface of igniter 40 which is closer to a lower end of ignition portion 41, as well as a surface of a portion of igniter 40 which is closer to an upper end of terminal pin 42.

Thus, opening 15 is completely buried by terminal pin 42 and holding portion 30, so that hermeticity of the space in the housing is ensured by sealability ensured in that portion. Since opening 15 is in a non-point-symmetrical shape in a plan view as described above, opening 15 and coupling portion 33 function also as a turning prevention mechanism which prevents fixing portion 30 from turning with respect to bottom plate portion 11 by burying opening 15 with coupling portion 33.

In a portion of outer cover portion 32 of holding portion 30, which faces the outside, female connector portion 34 is formed. This female connector portion 34 is a site for receiving a male connector (not shown) of a harness for connecting igniter 40 and a control unit (not shown) to each other, and it is located in depression portion 14 provided in bottom plate portion 11 of lower shell 10. In this female connector portion 34, a portion of igniter 40 closer to the lower end of terminal pin 42 is arranged as being exposed. The male connector is inserted in female connector portion 34, so that electrical conduction between a core wire of the harness and terminal pin 42 is established.

Injection molding described above may be carried out with the use of lower shell 10 obtained by providing an adhesive layer in advance at a prescribed position on a surface of bottom plate portion 11 in a portion to be covered with holding portion 30. The adhesive layer can be formed by applying an adhesive in advance to a prescribed position of bottom plate portion 11 and curing the adhesive.

By doing so, the cured adhesive layer is located between bottom plate portion 11 and holding portion 30, so that holding portion 30 formed from a resin molded portion can more firmly be secured to bottom plate portion 11. By providing the adhesive layer annularly along a circumferential direction so as to surround opening 15 provided in bottom plate portion 11, higher sealability can be ensured in that portion.

For the adhesive applied in advance to bottom plate portion 11, an adhesive containing as a source material, a resin material excellent in heat resistance, durability, corrosion resistance, and the like after curing is suitably made use of, and for example, an adhesive containing a cyanoacrylate-based resin or a silicone-based resin as a source material is particularly suitably made use of. An adhesive containing, other than the resin materials described above, various resin materials such as an epoxy-based resin, a polyimide-based resin, and an acrylic resin can be made use of as the adhesive described above.

Though such a construction example that igniter 40 is fixed to lower shell 10 by injection molding holding portion 30 formed from the resin molded portion is specifically exemplified above, another fixing method such as crimping can also be used for fixing igniter 40 to lower shell 10.

Cup-shaped member 50 is assembled to bottom plate portion 11 so as to cover protruding cylindrical portion 13, holding portion 30, and igniter 40. Cup-shaped member 50 has a substantially cylindrical shape with bottom having an open end on the side of bottom plate portion 11, and contains an enhancer chamber 55 accommodating enhancer agent 56. Cup-shaped member 50 is arranged to protrude into combustion chamber 60 accommodating gas generating agent 61, such that enhancer chamber 55 provided therein faces ignition portion 41 of igniter 40.

Cup-shaped member 50 has a top wall portion 51 and a sidewall portion 52 defining enhancer chamber 55 described above and an extension portion 53 extending radially outward from a portion of sidewall portion 52 on a side of an open end. Extension portion 53 is formed to extend along an inner surface of bottom plate portion 11 of lower shell 10. Specifically, extension portion 53 is in a shape curved along a shape of an inner bottom surface of bottom plate portion 11 in a portion where protruding cylindrical portion 13 is provided and in the vicinity thereof and includes a tip end 54 extending like a flange in a radially outer portion thereof.

Tip end 54 in extension portion 53 is arranged between bottom plate portion 11 and lower supporting member 62 along the axial direction of the housing and sandwiched between bottom plate portion 11 and lower supporting member 62 along the axial direction of the housing. Since lower supporting member 62 is pressed toward bottom plate portion 11 by gas generating agent 61, cushion material 64, upper supporting member 63, and top plate portion 21 arranged above, cup-shaped member 50 is in such a state that tip end 54 of extension portion 53 is pressed toward bottom plate portion 11 by lower supporting member 62 and fixed to bottom plate portion 11. Thus, cup-shaped member 50 is prevented from falling from bottom plate portion 11 without using crimping or press-fitting for fixing cup-shaped member 50.

Cup-shaped member 50 has an opening in neither of top wall portion 51 and sidewall portion 52 and surrounds enhancer chamber 55 provided therein. This cup-shaped member 50 bursts or melts with increase in pressure in enhancer chamber 55 or conduction of heat generated therein when enhancer agent 56 is ignited as a result of activation of igniter 40, and mechanical strength thereof is relatively low.

Therefore, a member made of metal such as aluminum or an aluminum alloy or a member made of a resin such as a thermosetting resin represented by an epoxy resin and the like and a thermoplastic resin represented by a polybutylene terephthalate resin, a polyethylene terephthalate resin, a polyamide resin (such as nylon 6 or nylon 66), a polypropylene sulfide resin, a polypropylene oxide resin, and the like is suitably made use of for cup-shaped member 50.

In addition to the above, a component which is formed from a member made of metal high in mechanical strength as represented by iron or copper, has an opening in sidewall portion 52 thereof, and has a sealing tape adhered to close the opening can also be made use of for cup-shaped member 50. A method of fixing cup-shaped member 50 is not limited to a fixing method using lower supporting member 62 described above, and other fixing methods such as fastening may be made use of.

Enhancer agent 56 charged into enhancer chamber 55 generates thermal particles as it is ignited to burn by flames produced as a result of activation of igniter 40. Enhancer agent 56 should be able to reliably start burning gas generating agent 61, and generally, a composition composed of metal powders/oxidizing agent represented by $B/KNO_3$, B/NaNO$_3$, or Sr(NO$_3$)$_2$, a composition composed of titanium hydride/potassium perchlorate, or a composition composed of B/5-aminotetrazole/potassium nitrate/molybdenum trioxide is employed. For enhancer agent 56, a powdery enhancer agent, an enhancer agent formed in a prescribed shape by a binder, or the like is made use of. A shape of enhancer agent 56 formed by a binder includes, for example, various shapes such as a granule, a column, a sheet, a sphere, a cylinder with a single hole, a cylinder with multiple holes, a tablet, and the like.

In a space surrounding a portion where cup-shaped member 50 described above is arranged in a space inside the housing and surrounded by filter 70, combustion chamber 60 accommodating gas generating agent 61 is located. Specifically, as described above, cup-shaped member 50 is arranged to protrude into combustion chamber 60 formed in the housing, and a space provided in a portion of this cup-shaped member 50 facing the outer surface of sidewall portion 52 and a space provided in a portion thereof facing an outer surface of top wall portion 51 are provided as combustion chamber 60.

Gas generating agent 61 is an agent which is ignited by thermal particles generated as a result of activation of igniter 40 and produces gas as it burns. A non-azide-based gas generating agent is preferably employed as gas generating agent 61, and gas generating agent 61 is formed as a molding generally containing a fuel, an oxidizing agent, and an additive.

For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use of.

As the oxidizing agent, for example, basic nitrate such as basic copper nitrate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of.

As the additive, a binder, a slag formation agent, a combustion modifier, or the like is exemplified. As the binder, for example, metal salt of carboxymethyl cellulose, an organic binder such as stearate, or an inorganic binder such as synthetic hydrotalcite and Japanese acid clay can suitably be made use of. As the slag formation agent, silicon nitride, silica, Japanese acid clay, or the like can suitably be made use of. As the combustion modifier, a metal oxide, ferrosilicon, activated carbon, graphite, or the like can suitably be made use of.

A shape of a molding of gas generating agent 61 includes various shapes such as a particulate shape including a granule, a pellet, and a column, and a disc shape. In addition, among columnar moldings, a molding with holes having through holes in the molding (such as a cylindrical shape with a single hole or a cylindrical shape with multiple holes) is also made use of. These shapes are preferably selected as appropriate depending on specifications of an air bag apparatus in which disc-type gas generator 1 is incorporated, and for example, a shape optimal for the specifications is preferably selected by selecting a shape allowing change over time of a rate of generation of gas during burning of gas generating agent 61. Furthermore, in addition to a shape of gas generating agent 61, a size of a molding or an amount thereof for filling is preferably selected as appropriate, in consideration of a linear burning velocity, a pressure exponent, or the like of gas generating agent 61.

As described above, filter 70 is arranged along the inner circumference of the housing, in the space surrounding combustion chamber 60 in the radial direction of the housing. Filter 70 has a substantially cylindrical and hollow outer geometry and it is arranged such that a central axis thereof substantially matches with the axial direction of the housing. Filter 70 thus radially surrounds combustion chamber 60 in which gas generating agent 61 is accommodated. Filter 70 is shaped into a short cylinder relatively large in diameter so as to be in conformity with the shape of disc-type gas generator 1.

Filter 70 functions as cooling means for cooling gas by removing heat at a high temperature from the gas when the gas produced in combustion chamber 60 passes through this filter 70 and also functions as removal means for removing slag contained in the gas. Details of filter 70 will be described later.

Filter 70 is arranged at a distance from circumferential wall portions 12 and 22 such that a gap 80 of a prescribed size from circumferential wall portion 22 of upper shell 20 and circumferential wall portion 12 of lower shell 10 which form the circumferential wall portion of the housing is provided. As gap 80 is provided, gas generated in combustion chamber 60 passes through substantially the entire region of filter 70 so that efficiency of use of filter 70 can be enhanced.

In the vicinity of the end of combustion chamber 60 located on the side of bottom plate portion 11, lower supporting member 62 is arranged. Lower supporting member 62 has an annular shape and is arranged to cover a boundary portion between filter 70 and bottom plate portion 11. Lower supporting member 62 positions and holds filter 70 by being in contact with an inner circumferential surface of filter 70 located on the side of bottom plate portion 11 and holds cup-shaped member 50 by sandwiching tip end 54 of cup-shaped member 50 between lower supporting member 62 and bottom plate portion 11.

Upper supporting member 63 is arranged at the end of combustion chamber 60 located on the side of top plate portion 21. Upper supporting member 63 is substantially in a shape of a disc and is arranged to cover the boundary portion between filter 70 and top plate portion 21. Upper supporting member 63 positions and holds filter 70 by being in contact with the inner circumferential surface of filter 70 located on the side of top plate portion 21 and holds cushion material 64 arranged therein.

Lower supporting member 62 and upper supporting member 63 prevent gas generated in combustion chamber 60 at the time of activation from flowing out through a gap between the lower end of filter 70 and bottom plate portion 11 and a gap between the upper end of filter 70 and top plate portion 21 without passing through filter 70. Lower supporting member 62 and upper supporting member 63 are formed, for example, by press-working a plate-shaped member made of metal, and suitably made of a member formed from a steel plate of common steel, special steel, or the like (such as a cold rolled steel plate or a stainless steel plate).

In upper supporting member 63, annular cushion material 64 is arranged to be in contact with gas generating agent 61 accommodated in combustion chamber 60. Cushion material 64 is thus located between top plate portion 21 and gas generating agent 61 in a portion of combustion chamber 60 on the side of top plate portion 21 and presses gas generating agent 61 toward bottom plate portion 11.

This cushion material 64 is provided for the purpose of preventing gas generating agent 61 made of a molding from being crushed by vibration or the like, and made of a member suitably formed of a molding of ceramic fibers, rock wool, a foamed resin (such as foamed silicone, foamed polypropylene, or foamed polyethylene), or rubber represented by chloroprene and EPDM.

A plurality of gas discharge openings 23 are provided in circumferential wall portion 22 of upper shell 20 in a portion facing filter 70. Gas discharge openings 23 serve for guiding gas which has passed through filter 70 to the outside of the housing and are arranged as being aligned in the circumferential direction of the housing.

To an inner circumferential surface of circumferential wall portion 22 of upper shell 20, a sealing tape 24 is attached to close the plurality of gas discharge openings 23. An aluminum foil or the like having a tacky member applied to its one surface can be made use of as this sealing tape 24 and hermeticity of combustion chamber 60 is ensured by sealing tape 24.

An operation of disc-type gas generator 1 in the present embodiment described above will now be described with reference to FIG. 1.

When a vehicle on which disc-type gas generator 1 in the present embodiment is mounted collides, collision sensing means separately provided in the vehicle senses collision, and based thereon, igniter 40 is activated in response to power feed through a control unit separately provided in the vehicle. Enhancer agent 56 accommodated in enhancer chamber 55 is ignited to burn by flames produced as a result of activation of igniter 40, to thereby generate a large amount of thermal particles. Burning of this enhancer agent 56 bursts or melts cup-shaped member 50 and the thermal particles described above flow into combustion chamber 60.

The thermal particles which have flowed in ignite and burn gas generating agent 61 accommodated in combustion chamber 60 and a large amount of gas is produced. The gas produced in combustion chamber 60 passes through filter 70. At that time, heat is removed from the gas through filter 70 and the gas is cooled, slag contained in the gas is removed by filter 70, and the gas flows into gap 80 provided around the outer circumferential portion of the housing.

As an internal pressure in the housing increases, sealing tape 24 which has closed gas discharge opening 23 provided in upper shell 20 is broken and the gas is discharged to the outside of the housing through gas discharge opening 23. The discharged gas is introduced in the air bag provided adjacent to disc-type gas generator 1 and it expands and develops the air bag.

Figure 2:
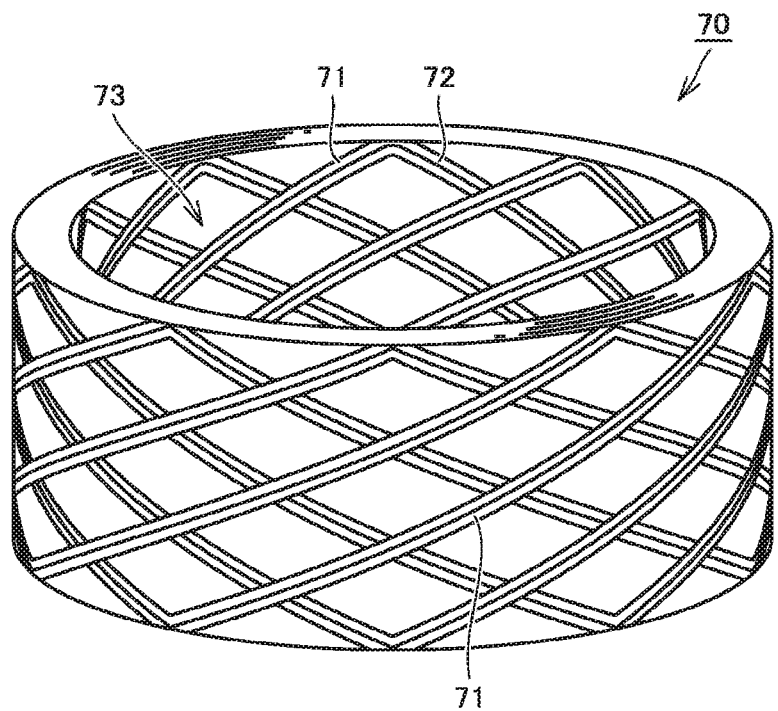
FIG. 2 is a schematic perspective view of a filter for gas generator in the embodiment of the present invention.
Figure 3:
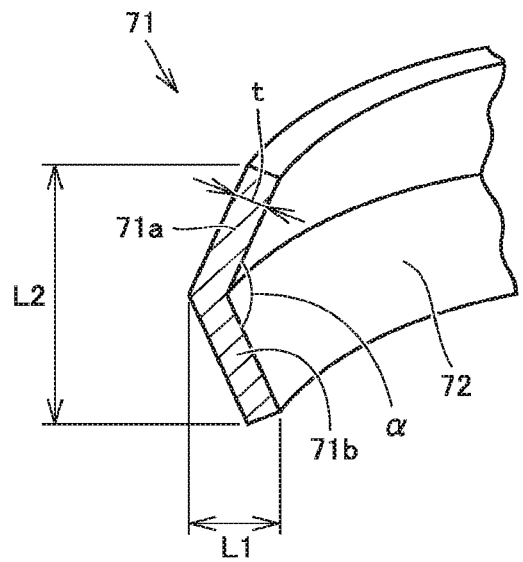
FIG. 3 is a diagram showing a shape of a metal wire which makes up the filter for gas generator shown in FIG. 2.

FIG. 2 is a schematic perspective view of the filter for gas generator in the present embodiment and FIG. 3 is a diagram showing a shape of a metal wire making up the filter for gas generator shown in FIG. 2. Filter 70 for gas generator in the present embodiment will now be described in detail with reference to FIGS. 2 and 3.

As shown in FIG. 2, filter 70 is formed by a substantially cylindrical and hollow wound body made by winding a metal wire 71 in a prescribed shape. Filter 70 includes a hollow portion 73 which passes through the filter along the axial direction, and hollow portion 73 defines combustion chamber 60 in which gas generating agent 61 is accommodated (see FIG. 1).

Metal wire 71 which forms filter 70 is wound in layers along the radial direction of filter 70. Filter 70 is thus structured such that metal wires 71 are layered along the radial direction. Metal wire 71 is wound diagonally so as to extend as intersecting with both of the circumferential direction and the axial direction of filter 70, and it is in a meshed pattern by folding back a direction of winding thereof at one and the other axial ends.

Though FIG. 2 shows only metal wire 71 in a portion located at a surface on an outer circumferential surface side and a surface on an inner circumferential surface side of filter 70 for facilitating understanding, filter 70 is actually constructed such that a gap between metal wires in the illustrated portion is also covered with metal wire 71 in a portion located on an inner side or an outer side.

As shown in FIG. 3, metal wire 71 is made of an elongated member of which cross-section at any position in a direction of extension thereof is identical. Specifically, metal wire 71 has an outer geometry like a bent plate having a V-shaped cross-section orthogonal to the direction of extension thereof and includes a first plate-shaped portion 71a and a second plate-shaped portion 71b which intersect with each other at a prescribed angle.

First plate-shaped portion 71a and second plate-shaped portion 71b are connected to each other at a central portion in a direction of width of metal wire 71 so that surfaces on a valley side of metal wire 71 define a V-shaped groove 72. An angle α of V-shaped groove 72 which is a smaller one of angles defined by first plate-shaped portion 71a and second plate-shaped portion 71b is not smaller than 130[°] and not greater than 140[°].

Examples of a material for metal wire 71 include stainless steel, iron steel, a nickel alloy, and a copper alloy, and in particular, austenite-based stainless steel is suitable. As will be described later, metal wire 71 is formed, for example, by forming an outer geometry thereof like a bent plate having a V-shaped cross-section described above by shaping with the use of a pair of rollers. Filter 70 may be made of a single metal wire 71 or a plurality of metal wires 71.

Though a thickness t of metal wire 71 (that is, a thickness of each of first plate-shaped portion 71a and second plate-shaped portion 71b) is not particularly restricted, the thickness is preferably not smaller than 0.145 [mm] and not greater than 0.210 [mm] and more preferably not smaller than 0.160 [mm] and not greater than 0.200 [mm].

Metal wire 71 preferably has a largest outer dimension L1 along a direction of depth of V-shaped groove 72 smaller than a largest outer dimension L2 along a direction of width of V-shaped groove 72. Largest outer dimension L1 of metal wire 71 is preferably not smaller than 0.5 [mm] and not greater than 5.0 [mm] and largest outer dimension L2 of metal wire 71 is preferably not smaller than 0.5 [mm] and not greater than 5.0 [mm] on condition that it is greater than largest outer dimension L1.

As shown in FIG. 2, in filter 70, V-shaped groove 72 defined in metal wire 71 described above is constructed to face hollow portion 73 of filter 70. A surface on the valley side of metal wire 71 defining V-shaped groove 72 is arranged to face a radially inner side of filter 70 and a surface on a mountain side of metal wire 71 is arranged to face a radially outer side of filter 70.

Figure 4:
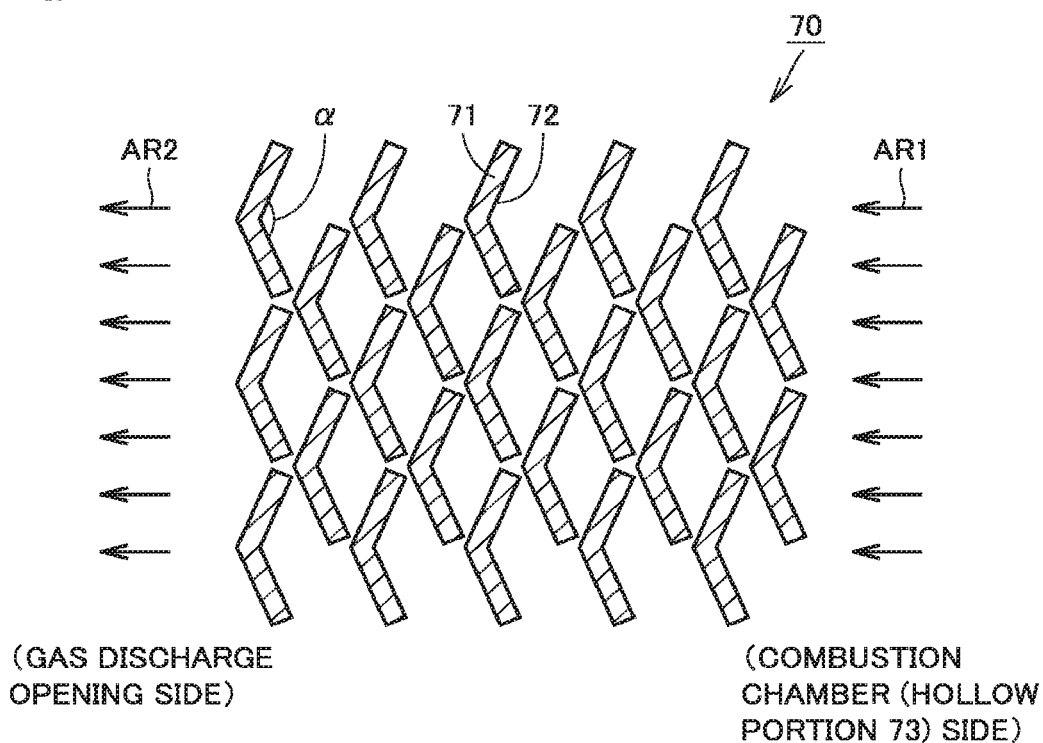
FIG. 4 is a diagram schematically showing a flow of gas which passes through the filter for gas generator shown in FIG. 2.
Figure 5:
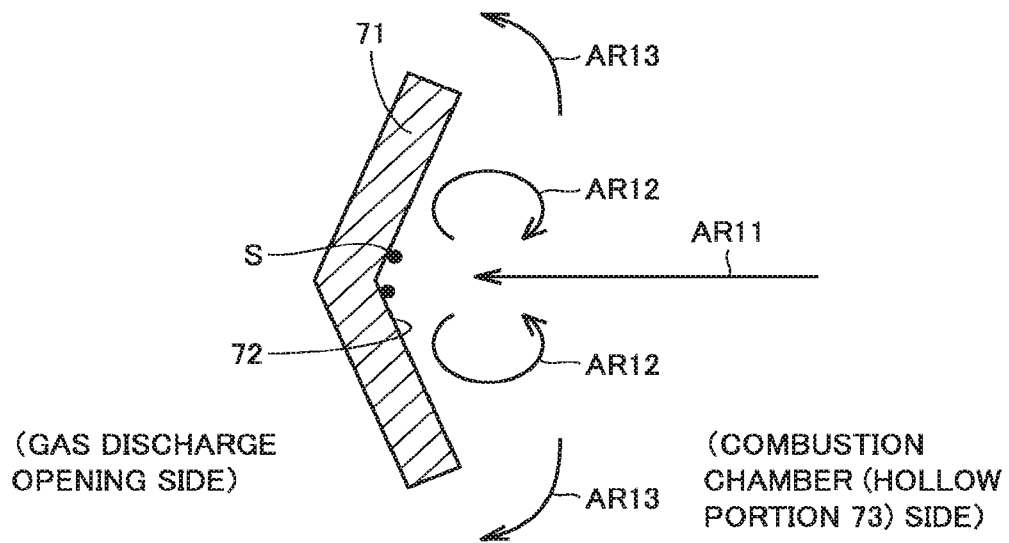
FIG. 5 is a schematic diagram showing in further detail the flow of gas shown in FIG. 4.

FIG. 4 is a diagram schematically showing a flow of gas which passes through the filter for gas generator shown in FIG. 2 and FIG. 5 is a schematic diagram showing in further detail the flow of gas shown in FIG. 4. A flow of gas at the time of activation of disc-type gas generator 1 in the present embodiment will now be described in detail with reference to FIGS. 4 and 5.

As described above, when disc-type gas generator 1 is activated, gas generated in combustion chamber 60 passes through filter 70 and reaches gas discharge opening 23 as shown in FIG. 4 (see also FIG. 1). At that time, gas generated in combustion chamber 60 enters filter 70 from the side of hollow portion 73 in filter 70 as shown in FIG. 4 (see an arrow AR1 shown in the figure) and moves substantially along the radial direction of filter 70. Thereafter, the gas is emitted to the outside of filter 70 (see an arrow AR2 shown in the figure).

As described above, in disc-type gas generator 1 in the present embodiment, V-shaped groove 72 defined in metal wire 71 which forms filter 70 faces hollow portion 73 (that is, combustion chamber 60). Therefore, a flow path where gas passes in filter 70 is complicated. Then, not only an area of contact of filter 70 with gas increases but also gas impinging on V-shaped groove 72 as indicated by arrow AR11 generates a small eddying flow in changing its direction in V-shaped groove 72, and consequently the flow of the gas becomes considerably turbulent (in the figure, the turbulent flow of gas is schematically shown with arrows AR12 and AR13). With such effects being combined, high cooling performance is obtained.

As shown in FIG. 5, slag S contained in gas impinging on V-shaped groove 72 is efficiently collected at the surface of V-shaped groove 72 so that slag S can be prevented from leaving again from V-shaped groove 72. Therefore, high slag collection performance is also obtained and an amount of emission of slag S to the outside of disc-type gas generator 1 can also significantly be reduced.

Disc-type gas generator 1 in the present embodiment is constructed such that angle α of V-shaped groove 72 defined in metal wire 71 is not greater than 140[°] as described above. Therefore, while a flow path of gas in filter 70 is complicated as described above, increase in pressure loss in filter 70 can be prevented. Therefore, pressure loss in filter 70 can be suppressed. Not only an effect that deformation of filter 70 at the time of activation can be suppressed but also an effect that clogging of the filter is less likely and an amount of emission of slag S can be reduced is also obtained.

Pressure loss in filter 70 is expressed by a value of a difference between a pressure of gas on an inlet side of filter 70 at the time of activation of disc-type gas generator 1 and a pressure of gas at an outlet side of filter 70 (that is, a difference between an internal pressure in combustion chamber 60 and an internal pressure in gap 80).

Figure 6:
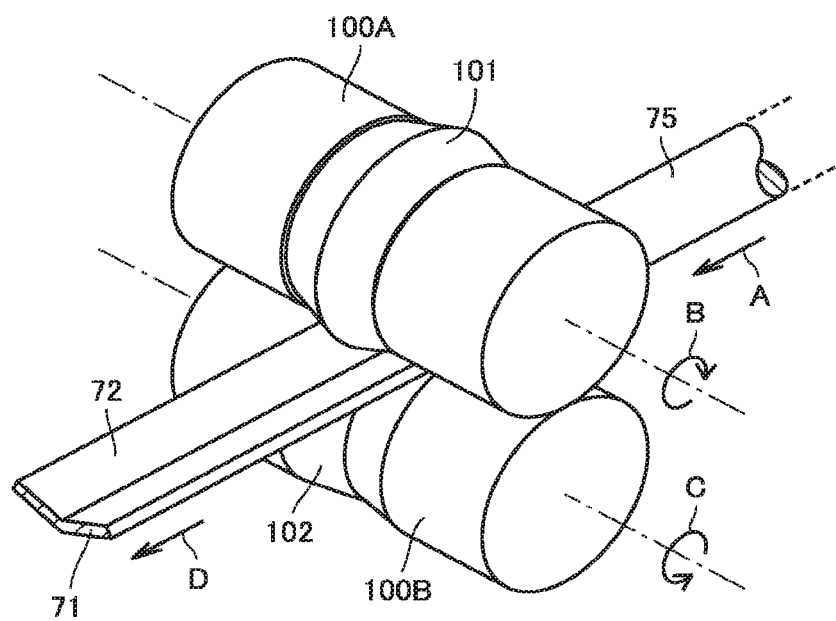
FIG. 6 is a schematic diagram showing a step of shaping a metal wire material into the metal wire shown in FIG. 3.
Figure 7:
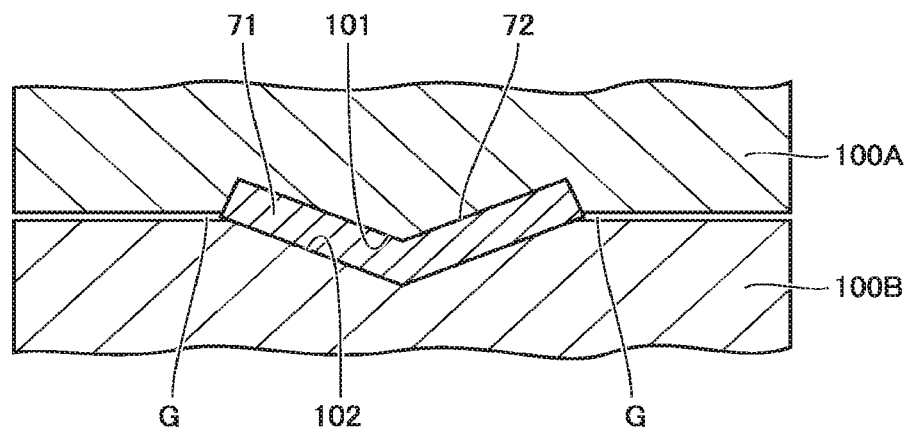
FIG. 7 is a schematic cross-sectional view of a rolling portion shown in FIG. 6.
Figure 8:
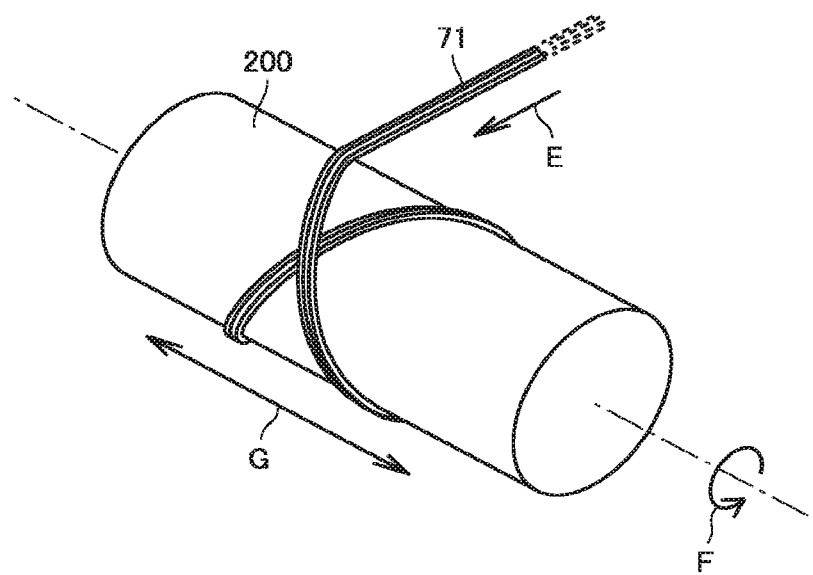
FIG. 8 is a diagram showing winding in manufacturing the filter for gas generator shown in FIG. 2 from the metal wire shown in FIG. 3.

FIG. 6 is a schematic diagram showing a step of shaping a metal wire material into the metal wire shown in FIG. 3 and FIG. 7 is a schematic cross-sectional view of a rolling portion shown in FIG. 6. FIG. 8 is a diagram showing winding in manufacturing the filter for gas generator shown in FIG. 2 from the metal wire shown in FIG. 3. A specific method of manufacturing filter 70 for gas generator in the present embodiment described above will now be described with reference to FIGS. 6 to 8.

In summary, filter 70 in the present embodiment is manufactured by fabricating elongated metal wire 71 in a shape as shown in FIG. 3 by rolling a metal wire material having an annular cross-section into a shape of a bent plate having a V-shaped cross-section and winding metal wire 71 substantially like a hollow cylinder.

As shown in FIGS. 6 and 7, metal wire 71 is obtained by shaping a metal wire material 75 with the use of a roller 100A including a projecting portion 101 extending along a circumferential direction at a prescribed position and a roller 100B including a recessed portion 102 extending along the circumferential direction at a prescribed position in rolling metal wire material 75.

More specifically, a pair of rollers 100A and 100B is arranged to be opposed to each other with projecting portion 101 and recessed portion 102 facing each other, and metal wire material 75 is supplied along a direction shown with an arrow A in the figure between projecting portion 101 and recessed portion 102 while the pair of rollers 100A and 100B is rotated in a direction shown with an arrow B and a direction shown with an arrow C in the figure. Metal wire material 75 is thus rolled and a shape of projecting portion 101 and recessed portion 102 is transferred to metal wire material 75, so that metal wire 71 ejected along a direction shown with an arrow D in the figure is formed like a bent plate having a V-shaped cross-section described above.

As shown in FIG. 8, in winding metal wire 71, a tip end of metal wire 71 is fixed at a prescribed position on a core material 200 in a columnar shape. Then, metal wire 71 is wound around core material 200 while metal wire 71 is supplied to core material 200 along a direction shown with an arrow E in the figure by rotating core material 200 in a direction shown with an arrow F in the figure in this state. At this time, metal wire 71 is diagonally wound around core material 200 by reciprocal motion of a position of metal wire 71 supplied to core material 200 with respect to the axial direction of core material 200 along a direction shown with an arrow G in the figure.

At this time, metal wire 71 is supplied to core material 200 such that the surface on the valley side of metal wire 71 faces core material 200. V-shaped groove 72 defined in metal wire 71 thus faces core material 200. After winding of metal wire 71 around core material 200 ends, metal wire 71 is cut and core material 200 is pulled out of the obtained wound body.

The wound body thus manufactured is thereafter subjected to heat treatment for sintering so that metal wire 71 is joined by heating. Filter 70 in the present embodiment is manufactured as above.

The specific method of manufacturing filter 70 described above is merely by way of example for obtaining a filter for gas generator in the present embodiment, and the filter can naturally be manufactured by another manufacturing method.

Disc-type gas generator 1 in the present embodiment is constructed such that angle α of V-shaped groove 72 defined in metal wire 71 is not smaller than 130[°] as described above. Therefore, an effect of relatively easy shaping of metal wire 71 is obtained and an effect of reliable manufacturing of filter 70 in a desired shape is obtained. This is because formability in rolling of metal wire material 75 becomes poor when angle α of V-shaped groove 72 is smaller than 130[°].

When angle α of V-shaped groove 72 is smaller than 130[°], a part of metal wire material 75 tends to lie in each of gaps G located on opposing outer sides of a portion where roller 100A and roller 100B are opposed to each other and projecting portion 101 and recessed portion 102 are opposed to each other, and fabricated metal wire 71 is inevitably partially distorted in shape.

When metal wire 71 partially distorted in shape is wound around core material 200, a position of winding is displaced due to such a shape, which leads to loss in shape. Then, a portion in an unintended distorted shape is produced also in filter 70 which should be formed substantially like a hollow cylinder. Filter 70 having such a distorted shape is unusable and yield also significantly becomes poor.

In contrast, disc-type gas generator 1 in the present embodiment described above can be free from such a problem. Therefore, an effect of relatively easy shaping of metal wire 71 is obtained and an effect of reliable manufacturing of filter 70 in a desired shape is obtained.

As described above, filter 70 for gas generator and disc-type gas generator 1 including the same in the present embodiment can provide a filter for gas generator and a gas generator including the same which are high in performance and productivity.

Figures 9, 10:
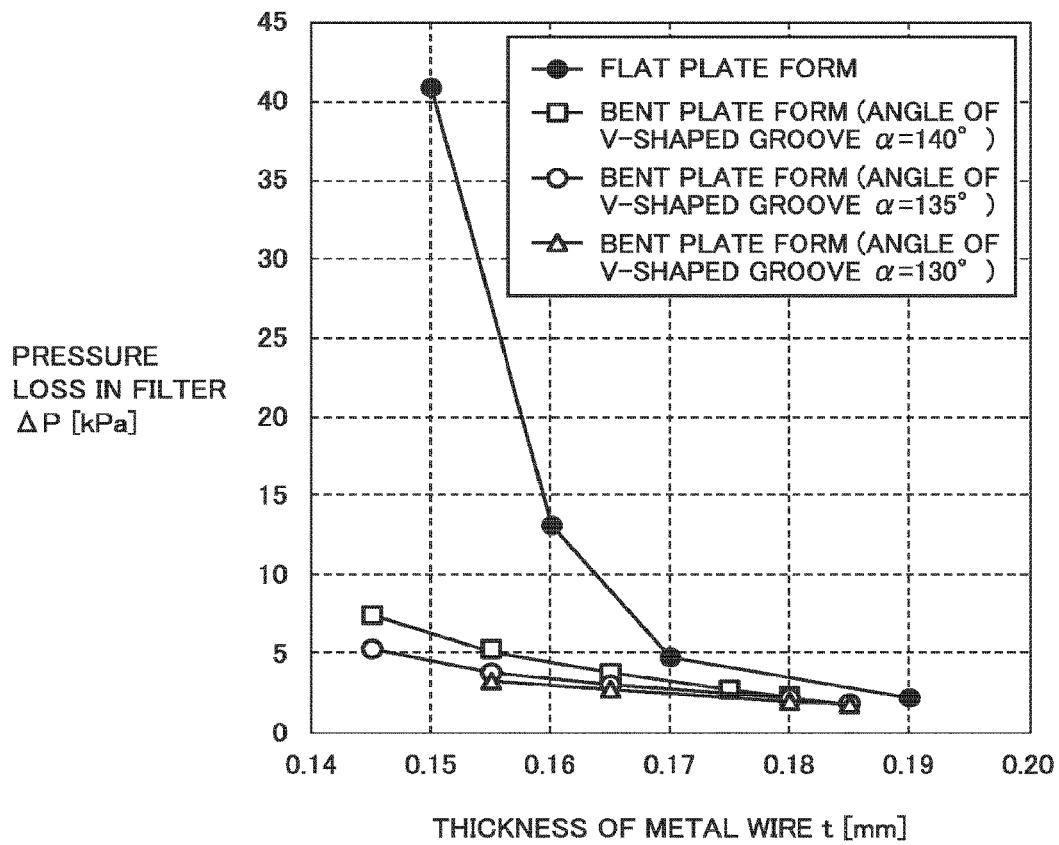
FIG. 9 shows a graph of a test result in a first verification test.
FIG. 10 shows a table of a test result in a second verification test.

A first verification test conducted for confirming the effects of the present invention will now be described in detail. In the first verification test, how relation between a thickness of a metal wire and pressure loss in a filter was varied was checked when an angle of a V-shaped groove defined in the metal wire was variously changed. FIG. 9 shows a graph of a test result in the first verification test.

As shown in FIG. 9, in the first verification test, four types of filters in total were actually manufactured. The filters were formed by winding a metal wire in a shape of a flat plate and metal wires each in a shape of a bent plate having a V-shaped cross-section with angle α of a V-shaped groove being set to 140[°], 135[°], and 130[°] and with thickness t of the metal wires being variously changed for each type. Pressure loss ΔP at the time when gas passed through each of the filters at a flow rate of 1000 [L/min.] was actually measured.

Consequently, as is understood in FIG. 9, it could be confirmed that pressure loss ΔP in the filter was suppressed when the filter was manufactured by winding the metal wire of which angle α of the V-shaped groove was not smaller than 130[°] and not greater than 140[°]. It could also be confirmed that increase in pressure loss ΔP in the filter due to decrease in thickness t of the metal wire could be suppressed by employing the filter manufactured by winding the metal wire in the shape of the bent plate rather than the filter manufactured by winding the metal wire in the shape of the flat plate. It could be confirmed that pressure loss ΔP in the filter could be suppressed to approximately 7.5 [kPa] at the maximum in particular by setting thickness t of the metal wire within a range not smaller than 0.145 [mm] and not greater than 0.185 [mm].

A second verification test conducted for confirming the effects of the present invention will now be described in detail. In the second verification test, how an amount of emission of slag was varied when pressure loss in the filter was suppressed in filters substantially equivalent in cooling performance to one another was checked. FIG. 10 shows a table of a test result in the second verification test.

As shown in FIG. 10, in the verification test, four filters according to first to fourth verification examples were actually manufactured, with a circumferential length and a total length of metal wires being varied such that surface areas thereof were substantially equivalent for setting cooling performance of the filters to substantially be equivalent to one another. Each of the filters was incorporated in the disc-type gas generator as shown in FIG. 1 and the individual disc-type gas generator was actually activated. Pressure loss ΔP and an amount of emission of slag were thus actually measured.

The circumferential length of the metal wire refers to a length of a contour line of the metal wire in a cross-section orthogonal to the direction of extension thereof, and the total length of the metal wire refers to a length in the direction of extension thereof required for manufacturing of the filter. The four filters according to the first to fourth verification examples were substantially identical to one another in surface area within a range approximately from 7.51 to $7.60 \times 10^4$ [mm$^2$].

Consequently, as is understood in FIG. 10, it was confirmed that, with lowering in pressure loss ΔP in the filter, an amount of emission of slag also tended to decrease. This may be because, as a result of suppression of pressure loss ΔP in the filter, clogging of the filter was less likely at the time of activation of the disc-type gas generator and hence an amount of emission of slag could be reduced.

It could also experimentally be confirmed from the results in the first and second verification tests described above that filter 70 for gas generator and disc-type gas generator 1 including the same in the embodiment described above could provide a filter for gas generator and a gas generator including the same which were high in performance.

Though an example in which the present invention is applied to what is called a disc type gas generator and a filter for gas generator equipped therein has been described above in the embodiment of the present invention, the present invention can naturally be applied also to what is called a cylinder type gas generator and a filter for gas generator equipped therein. The cylinder type gas generator is suitably incorporated, for example, in a side air bag apparatus or a curtain air bag apparatus, and it is more elongated in outer geometry than the disc-type gas generator. Therefore, a filter for gas generator equipped in the cylinder-type gas generator is in an elongated cylindrical shape relatively small in diameter.

In applying the present invention to a cylinder-type gas generator and a filter for gas generator equipped therein, in order to enhance strength of a filter in the axial direction, a metal wire diagonally wound to intersect with both of the circumferential direction and the axial direction of the filter is preferably wound as being inclined to be in more parallel to the axial direction.

The embodiment disclosed herein is illustrative and non-restrictive in every respect. The technical scope of the present invention is delimited by the terms of the claims and includes any modifications within the scope and meaning equivalent to the terms of the claims.

REFERENCE SIGNS LIST 1 disc-type gas generator; 10 lower shell; 11 bottom plate portion; 12 circumferential wall portion; 13 protruding cylindrical portion; 14 depression portion; 15 opening; 20 upper shell; 21 top plate portion; 22 circumferential wall portion; 23 gas discharge opening; 24 sealing tape; 30 holding portion; 31 inner cover portion; 32 outer cover portion; 33 coupling portion; 34 female connector portion; 40 igniter; 41 ignition portion; 42 terminal pin; 50 cup-shaped member; 51 top wall portion; 52 sidewall portion; 53 extension portion; 54 tip end; 55 enhancer chamber; 56 enhancer agent; 60 combustion chamber; 61 gas generating agent; 62 lower supporting member; 63 upper supporting member; 64 cushion material; 70 filter; 71 metal wire; 71a first plate-shaped portion; 71b second plate-shaped portion; 72 V-shaped groove; 73 hollow portion; 75 metal wire material; 80 gap; 100A, 100B roller; 101 projecting portion; 102 recessed portion; 200 core material; and G gap

The invention claimed is:

1. A substantially cylindrical and hollow filter for a gas generator, the filter being made of a wound body of a metal wire, the metal wire being made of an elongated member having a V-shaped cross-section orthogonal to a direction of extension of the metal wire, a V-shaped groove defined in the metal wire facing a hollow portion in the filter for the gas generator, an angle of the V-shaped groove being not smaller than 130° and not greater than 140°, and the metal wire has a thickness not smaller than 0.145 mm and not larger than 0.210 mm.

2. The filter fora gas generator according to claim 1, wherein
a largest outer dimension of the metal wire along a direction of depth of the V-shaped groove is smaller than a largest outer dimension of the metal wire along a direction of width of the V-shaped groove.

3. The filter fora gas generator according to claim 1, wherein
the filter for the gas generator is constructed in a meshed pattern by diagonally winding the metal wire by folding back a direction of winding at one and the other axial ends of the filter for the gas generator.

4. A gas generator comprising the filter for a gas generator according to claim 1.

* * * * *